(12) United States Patent
Zhou et al.

(10) Patent No.: US 12,062,820 B2
(45) Date of Patent: Aug. 13, 2024

(54) INVERSE DESIGN OF FUEL CELL BIPOLAR PLATE FLOW FIELDS THROUGH ANISOTROPIC POROUS MEDIA OPTIMIZATION

(71) Applicant: Toyota Motor Engineering & Manufacturing North America, Inc., Plano, TX (US)

(72) Inventors: Yuqing Zhou, Ann Arbor, MI (US); Danny J. Lohan, Northville, MI (US); Feng Zhou, Ann Arbor, MI (US); Hiroshi Ukegawa, South Lyon, MI (US); Tsuyoshi Nomura, Nagoya (JP); Ercan M. Dede, Ann Arbor, MI (US)

(73) Assignee: TOYOTA MOTOR ENGINEERING & MANUFACTURING NORTH AMERICA, INC, Plano, TX (US)

( * ) Notice: Subject to any disclaimer, the term of this patent is extended or adjusted under 35 U.S.C. 154(b) by 286 days.

(21) Appl. No.: 17/407,657

(22) Filed: Aug. 20, 2021

(65) Prior Publication Data
US 2023/0058792 A1 Feb. 23, 2023

(51) Int. Cl.
*H01M 8/0258* (2016.01)
*G06F 17/18* (2006.01)
*G06F 30/18* (2020.01)

(52) U.S. Cl.
CPC .......... *H01M 8/0258* (2013.01); *G06F 17/18* (2013.01); *G06F 30/18* (2020.01)

(58) Field of Classification Search
CPC ...... H01M 8/0258; G06F 17/18; G06F 30/18; G06F 17/11; G06F 2111/06; G06F 30/28; Y02E 60/50
See application file for complete search history.

(56) References Cited

U.S. PATENT DOCUMENTS

| 2013/0183599 A1* | 7/2013 | Otsuka | H01M 8/04052 429/408 |
| 2020/0266453 A1* | 8/2020 | Dede | H01M 8/0258 |
| 2021/0064715 A1* | 3/2021 | Dede | H01M 8/0258 |

OTHER PUBLICATIONS

Dede et al. "Inverse Design of Fluid Flow Structure with Turing Pattern", Retrieved from https://arxiv.org/pdf/1911.05832.pdf (Year: 2019).*
J. M. Commenge, L. Falk, J. P. Corriou, M. Matlosz, Optimal design for flow uniformity in microchannel reactors, AIChE J. 48, 345 (2002). (Year: 2002).*
Liu et al. "Profiling Pareto Front With Multi-Objective Stein Variational Gradient Descent" (Year: 2021).*

* cited by examiner

*Primary Examiner* — Rehana Perveen
*Assistant Examiner* — Troy A Maust
(74) *Attorney, Agent, or Firm* — Jordan IP Law, LLC

(57) ABSTRACT

One or more methods of designing microchannel fluid flow networks in a fuel cell bipolar plate includes executing one or more programs on one or more computing devices having one or more processors to optimize the spatially varying orientations of homogenized anisotropic porous media by iteratively executing a gradient-based algorithm that incorporates objective functions of reaction uniformity and flow resistance, and then generate, in response to the homogenized anisotropic porous media optimization, one or more microchannel fluid flow networks by dehomogenizing the optimized anisotropic porous media.

20 Claims, 8 Drawing Sheets
(2 of 8 Drawing Sheet(s) Filed in Color)

INVERSE DESIGN OF FUEL CELL BIPOLAR PLATE FLOW FIELDS THROUGH ANISOTROPIC POROUS MEDIA OPTIMIZATION

TECHNICAL FIELD

Embodiments relate generally to one or more methods for designing fuel cell bipolar plate flow fields for optimized reaction-fluid performance.

BACKGROUND

Conventional fuel cell bipolar plate fluid flow fields are designed using forward design methods, where the flow path layout is fixed, and the size of pathways may be optimized to meet system requirements. This type of design method heavily depends on the initial layout, which is selected by the designer a priori. There are numerous examples of flow fields optimized using forward design to create parallel, serpentine, and interdigitated structures. Researchers have also drawn inspiration from biology to design novel flow fields including tree, lung, and fractal structures.

To facilitate out-of-the-box innovative designs, inverse design methods can be used, where the topology of the network is not defined a priori. The flow field design can be formulated as a material (i.e., fluid channel or wall) distribution problem. Optimization iterations are then used to arrive at a channel layout by minimizing target design objectives while performing physics simulations and sensitivity analysis. Topology optimization has been applied to design microreactors, e.g., fuel cells, and redox flow batteries, with significant improvement in reaction productivity when compared with conventional, forward designed, reactors.

Direct topology optimization methods, however, require high computational cost and are often constrained to simple (i.e., limited channel number) academic problems.

Additionally, in compact configurations, coolant also enters and exits the fuel cell stack and flows within coolant channels defined by the opposite sides of the hydrogen plate and the air plate. In such configurations, however, the coolant channels are very narrow or completely blocked, while in other regions the coolant channels are wide and open. This may lead to non-uniform cooling throughout the fuel cell stack, and consequently, inefficient fuel cell stack performance.

As the fuel cell technology moves towards the cost-aware commercial sectors, the challenge of designing high performance, low cost, lightweight, and compact fuel cell stacks has sparked trending interests in novel configuration design of fluid flow networks in fuel cell bipolar plates.

In the design of fuel cells, an inverse design approach has been used in which the design of flow fields is formulated as a material (i.e., channel or wall) distribution problem. Contemporary design methods generally use explicit topology optimization, which are inevitably expensive in computation. Consequently, resultant designs from the topology optimization methods all have a reduced number of channels, as opposed to hundreds of channels.

BRIEF SUMMARY

In accordance with one or more embodiments, one or more methods are implemented to obtain anisotropic porous media optimization and also to design fuel cell flow fields using dehomogenization of the optimized anisotropic porous media. Both the reaction uniformity and pressure drop are optimized simultaneously using a multi-objective formulation.

In accordance with one or more embodiments, one or more methods are implemented that include optimizing a spatially varying two-dimensional (2D) orientation field of the homogenized anisotropic porous media using a gradient-based framework, and then dehomogenizing the optimized anisotropic porous media and synthesizing three-dimensional (3D) microchannel fluid flow networks.

In accordance with one or more embodiments, a method of designing a microchannel fluid flow networks in a fuel cell bipolar plate may comprise one or more of the following: by one or more computing devices having one or more processors: optimizing the spatially varying orientations of homogenized anisotropic porous media by iteratively executing a gradient-based algorithm that incorporates objective functions of reaction uniformity and flow resistance; and generating, in response to the homogenized anisotropic porous media optimization, one or more microchannel fluid flow networks by dehomogenizing the optimized anisotropic porous media.

In accordance with one or more embodiments, a method of designing a microchannel fluid flow networks in a fuel cell bipolar plate may comprise one or more of the following: by one or more computing devices having one or more processors: simultaneously optimizing reaction uniformity and flow resistance by iteratively executing a gradient-based algorithm to generate homogenized anisotropic porous media for the fuel cell flow fields; and generating, in response to the homogenized anisotropic porous media optimization, one or more microchannel fluid flow networks by dehomogenizing the optimized anisotropic porous media.

In accordance with one or more embodiments, a computer program product, comprising a set of instructions, which when executed by one or more processors, cause the one or more processors to: design microchannel fluid flow networks in a fuel cell bipolar plate by: optimizing the spatially varying orientations of homogenized anisotropic porous media by iteratively executing a gradient-based algorithm that incorporates objective functions of reaction uniformity and flow resistance; and generating, in response to the homogenized anisotropic porous media optimization, one or more microchannel fluid flow networks by dehomogenizing the optimized anisotropic porous media.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The various advantages of the embodiments of will become apparent to one skilled in the art by reading the following specification and appended claims, and by referencing the following drawings, in which:

DETAILED DESCRIPTION

Figure 1:
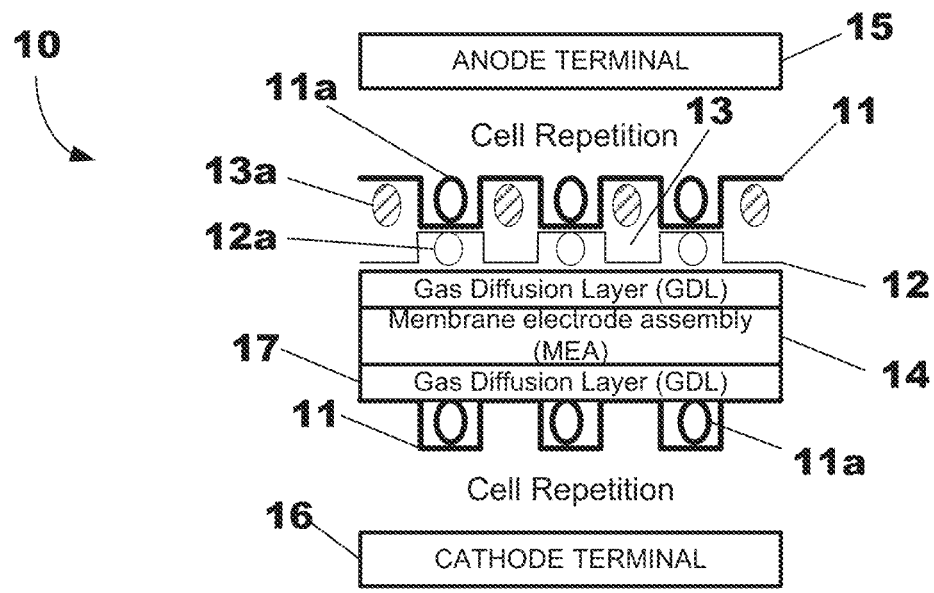
FIG. 1 illustrates a configuration of a stacked fuel cell bipolar plate, in accordance with one or more embodiments set forth, described, and/or illustrated herein.

As illustrated in FIG. 1, a fuel cell 10 comprises a first bipolar plate comprising a first stamped metal plate or layer 11 (serving as the anode), a second stamped metal plate or layer 12 (serving as the cathode), and a membrane electrode assembly (MEA) membrane 14 and a pair of gas diffusion layers (GDLs) 17 interposed therebetween. An anode terminal electrode 15 is electrically connected to the anode 11, while a cathode terminal electrode 16 is electrically connected to the cathode 12.

The first stamped metal plate or layer 11 has a plurality of independently formed air fluid flow networks 11a, and the second stamped metal plate or layer 12 has a plurality of independently formed hydrogen fluid flow networks 12a. Through the stacking of the first stamped metal plate 11 and the second stamped metal plate 12, a coolant layer 13 comprising a plurality of coolant flow networks 13a is defined. In this way, the coolant fluid flow network configuration 13a is dependent upon the independently-formed air networks 11a and hydrogen channels 12a.

The local permeability of the coolant flow networks 13a is highest where both the air layer 11 and the hydrogen layer 12 are walls. The local permeability of the coolant flow networks 13a is moderate where either the air layer 11 or the hydrogen layer 12 is a channel (or wall). Finally, the local permeability of the coolant flow networks 13a is lowest where both the air layer 11 and the hydrogen layer 12 are channels.

Figure 2:
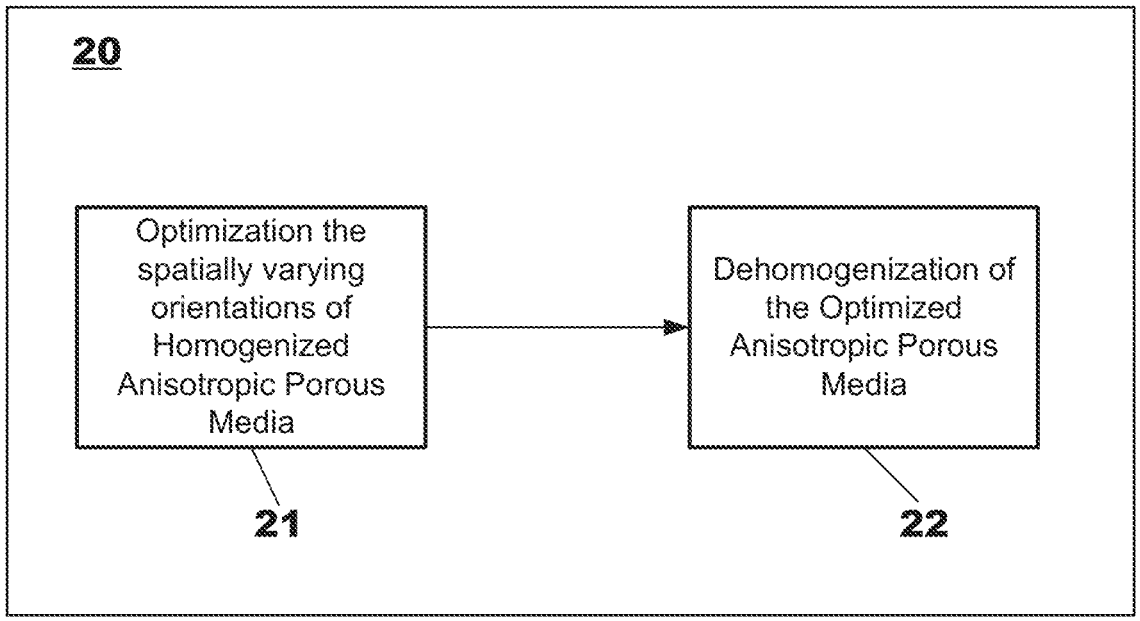
FIG. 2 illustrates a diagram of a method of designing flow fields in a fuel cell bipolar plate, in accordance with one or more embodiments set forth, described, and/or illustrated herein.

As illustrated in FIG. 2, in accordance with one or more embodiments, one or more dehomogenization-based methods comprises implementation of a two-stage design process 20 which includes: a homogenized anisotropic porous media optimization stage 21, to be followed by a dehomogenization stage 22 to generate microchannel fluid flow networks for the fuel cell. At the homogenized anisotropic porous media optimization stage 21, iteratively executing a gradient-based algorithm that is based on the objectives of minimizing pressure drop across the fuel cell while also obtaining uniform reaction performance across the fuel cell.

Orientation Tensor Design Variable

The parameterization of the orientation field follows the orientation tensor method previously proposed for elastic composite design problems. In a prescribed design domain, the orientation at a point in 2D space is represented by an orientation tensor, a, which is related to an orientation vector, $p=(p_1, p_2)$, as follows.

$$a = (a_{ij}) = \begin{pmatrix} a_{11} & a_{12} \\ sym. & a_{22} \end{pmatrix} = p \otimes p = \begin{pmatrix} p_1 p_1 & p_1 p_2 \\ sym. & p_2 p_2 \end{pmatrix}.$$

A 2×2 symmetric matrix field variable $q=(q_{ij}) \to (a_{ij})$ with $q_{ij} \in [0,1]$ is used as the design variable, which is regularized with filters and projected to $(a_{ij})$.

Anisotropic Permeability Tensor

The global permeability tensor, K, of an anisotropic porous medium rotated by the orientation tensor, a, is interpolated as follows.

$$K = (K_{ij}) = \begin{pmatrix} K_{11} & K_{12} \\ sym. & K_{22} \end{pmatrix},$$

where $$\begin{cases} K_{11} = a_{11}(K^{(1)} - K^{(2)}) + K^{(2)} \\ K_{12} = a_{12}(K^{(1)} - K^{(2)}) \\ K_{21} = K_{12} \\ K_{22} = a_{22}(K^{(1)} - K^{(2)}) + K^{(2)} \end{cases}$$

$K^{(1)}$ is the local permeability in the major flow direction along the microchannel, and $K^{(2)}$ is the local permeability in the minor flow direction orthogonal to the microchannel. Both will be obtained via a local-level unit cell analysis, and Darcy's law is used to compute the effective porous medium permeability.

Multiphysics Equilibrium

The governing physics inside microreactors can be modeled with Navier-Stokes equations and advection-diffusion-reaction equations. Chemical reaction is assumed to be proportional to the fluid reactant concentration.

The anisotropic fluid flow physics is governed by the Navier-Stokes equations as follows, $$\rho(u \cdot \nabla)u = -\nabla p + \nabla \cdot (\mu(\nabla u + (\nabla u)^T)) - (\mu K^{-1})u,$$

$$\nabla \cdot u = 0,$$

where $\rho$, $\mu$, $u$, and $p$ are the fluid density, dynamic viscosity, velocity vector (state variable) and pressure (state variable). To model the reaction physics, the solved fluid velocity vector, u, is coupled with the advection-diffusion-reaction equations, $$\nabla \cdot (-D\nabla c) + u \cdot \nabla c = R,$$

$$R = -\beta c,$$

where, c, is the concentration (state variable), R, is the local reaction rate assumed linearly proportional to the concentration, D, is the diffusion coefficient, and $\beta$ is the reaction coefficient.

Optimization Formulation

To design efficient, high-performing, and reliable fuel cell stacks, the identified objectives comprise the reaction uniformity and fluid flow resistance. By enhancing the reaction uniformity across the design domain, the overall reaction area is utilized more efficiently, and thus, increases the total reaction by the fuel cell. By reducing the flow resistance, less pumping power is required, thereby enhancing the overall efficiency and performance of the fuel cell.

The multi-objective anisotropic porous media optimization problem is formulated as follows, $$\min_{q_{ij}} : F = w_1 f_1 + w_2 f_2$$

$$\text{subject to: } q_{ij} \in [0,1],$$

design variable regularization and projection, multiphysics equilibrium equations, where $$f_1 = \int_\Omega \left(\frac{c - c_{avg}}{c_{avg}}\right)^2 d\Omega,$$

$$f_2 = \frac{1}{2} \int_\Omega \nabla u \cdot (\nabla u + (\nabla u)^T) d\Omega,$$

where $f_1$ is the reaction variation objective, $f_2$ is the flow resistance objective, and $w_1$ and $w_2$ are corresponding weighting factors. Different weighting factors can be selected to investigate the trade-offs between the objectives of minimizing flow resistance (i.e., pressure drop) across the fuel cell and uniform reaction performance across the fuel cell.

DISCUSSION

Figure 3:
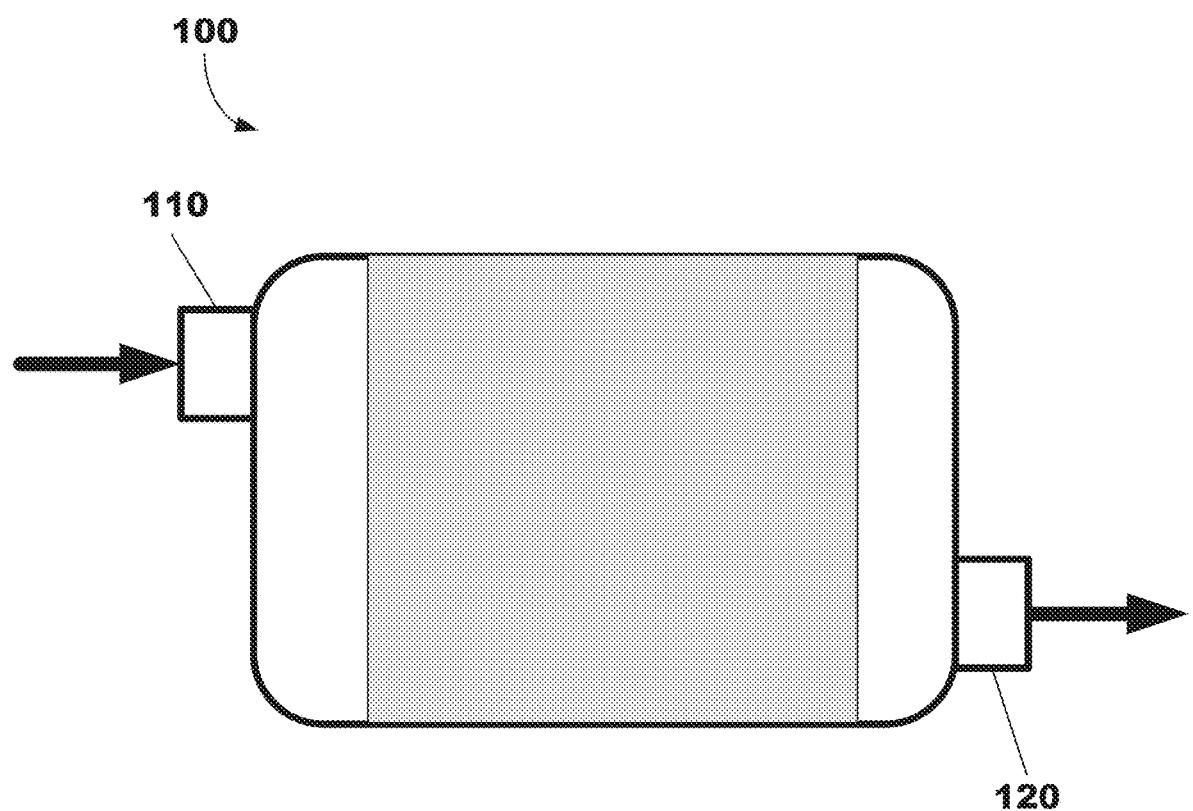
FIG. 3 illustrates design and domain conditions in an example fuel cell bipolar plate, in accordance with one or more embodiments set forth, described, and/or illustrated herein.

In the illustrated example of FIG. 3, a diagonal inlet-outlet fluid flow configuration 100 is used to demonstrate the inverse design method. The inlet 110 has a prescribed mass flow rate and initial concentration while the outlet 120 is set as zero pressure.

The multi-objective optimization problem is solved by the Method of Moving Asymptotes (MMA). COMSOL Multiphysics is used to solve for physics equilibrium and perform sensitivity analysis. COMSOL LiveLink for MATLAB is used to integrate COMSOL solutions into a MATLAB controlled iterative optimization loop.

Unit Cell Analysis

Figure 4A:
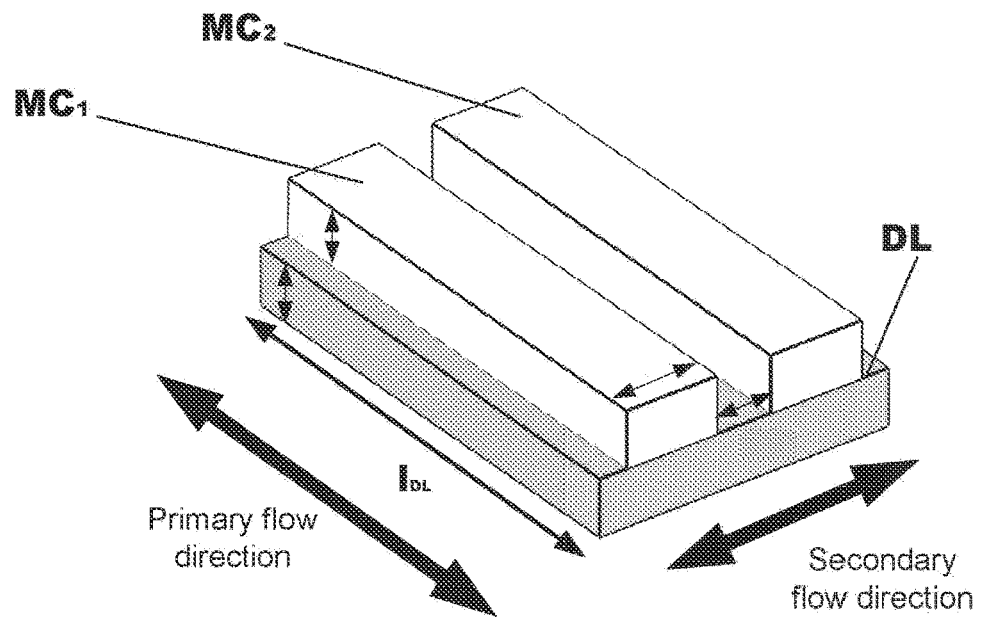
FIGS. 4A to 4C illustrate a unit cell configuration of a microchannel fluid flow structure inside a fuel cell bipolar plate and a gas diffusion layer, unit cell analysis in a primary flow direction, and unit cell analysis in a secondary flow direction, in accordance with one or more embodiments set forth, described, and/or illustrated herein.
Figure 4B:
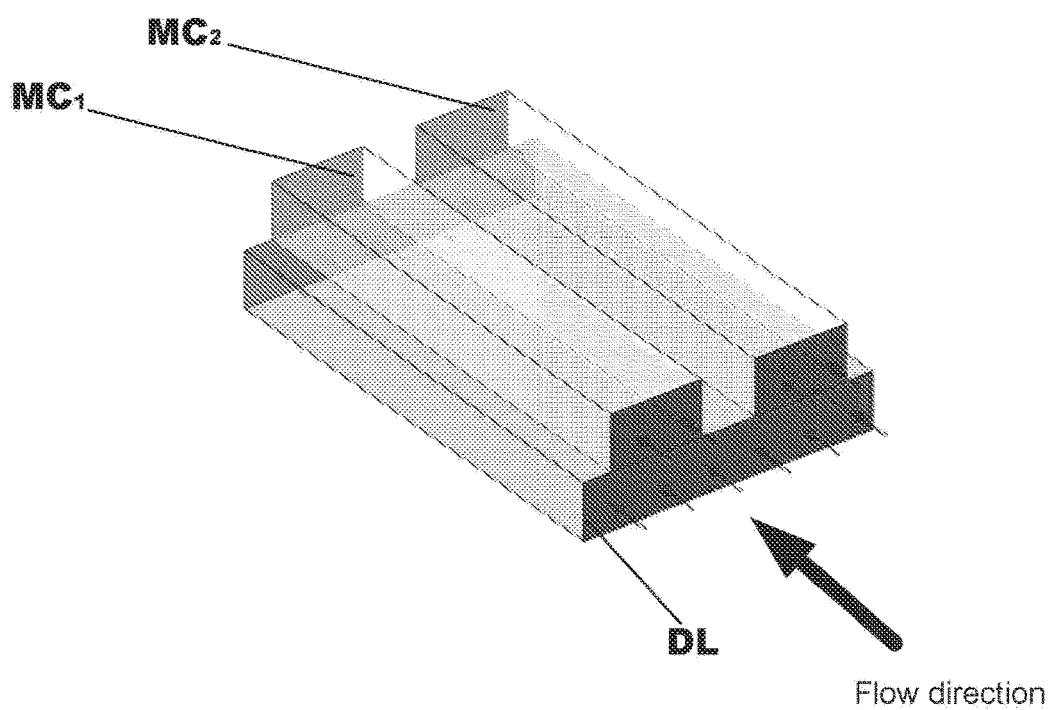
Figure 4C:
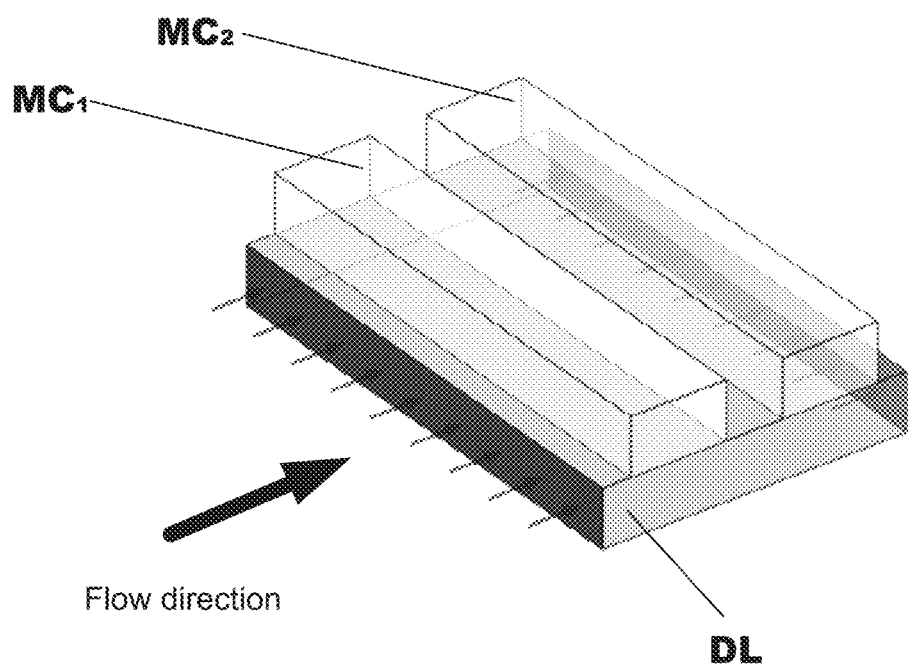

To obtain the permeability in the major (primary) directions and minor (secondary) directions in the effective anisotropic porous medium, two separate local unit cell analyses are conducted. The geometry and boundary conditions are illustrated in FIGS. 4A to 4C, in which a porous gas diffusion layer DL with a prescribed permeability has extending thereon a first microchannel $MC_1$ and a second microchannel $MC_2$. The entire unit cell is treated as a homogenized porous medium having anisotropic permeability. The permeability along the channel along a primary flow direction is greater than the permeability perpendicular to the channel along a secondary flow direction.

Based on a set of conditions, and following Darcy's law, the effective permeability in the major flow direction along the microchannel, $K^{(1)}$, and the permeability in the minor flow direction orthogonal to the microchannel, $K^{(2)}$, can be computed.

Optimized Designs

FIGS. 5A to 5D, 6A to 6D, and 7A to 7D illustrate optimized anisotropic porous media designs and the associated dehomogenized microchannel fluid flow networks that are assigned different weighting factors in the multi-objective function.

Figure 5A:
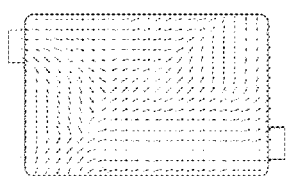
FIGS. 5A to 5D illustrate optimized anisotropic porous media results and the associated dehomogenized microchannel fluid flow networks of a fuel cell bipolar plate design that prioritizes the minimum flow resistance, in accordance with one or more embodiments set forth, described, and/or illustrated herein.
Figure 6A:
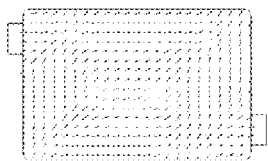
FIGS. 6A to 6D illustrate optimized anisotropic porous media results and the associated dehomogenized microchannel fluid flow networks of a fuel cell bipolar plate design that balances uniform reaction and flow resistance, in accordance with one or more embodiments set forth, described, and/or illustrated herein.
Figure 7A:
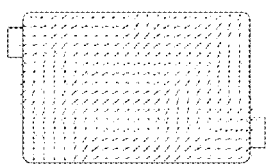
FIGS. 7A to 7D illustrate optimized anisotropic porous media results and the associated dehomogenized microchannel fluid flow networks of a fuel cell bipolar plate design that prioritizes uniform reaction, in accordance with one or more embodiments set forth, described, and/or illustrated herein.

FIGS. 5A, 6A, and 7A illustrate optimized primary flow orientation of each respective optimized fuel cell design. Orientations of anisotropic porous media are optimized for certain performance objectives using a gradient-based iterative approach. The reaction-fluid performance at each optimization iteration is evaluated by physics simulations including the Navier-stokes equations (governing the flow physics) and advection diffusion reaction equations (governing the reaction physics). The design update is guided by the sensitivity analysis. The arrows are aligned with the more permeable primary channel direction.

Figure 5B:
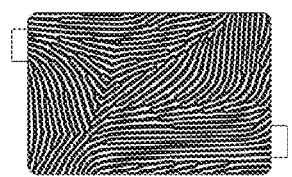
Figure 6B:
Figure 7B:
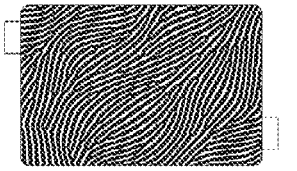

FIGS. 5B, 6B, and 7B illustrate dehomogenized microchannel fluid flow network of a respective optimized fuel cell design. The optimized anisotropic porous media can be dehomogenized as microchannel fluid flow networks following on the unit cell configuration by solving a diffusion-reaction system. The dark/black regions indicate the fluid domain and the light/white regions indicate the wall domain. It is noted that each microchannel fluid flow field follows the optimized orientation illustrated in FIGS. 5A, 6A, and 7A, respectively.

Figure 5C:
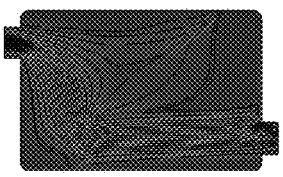
Figure 5D:
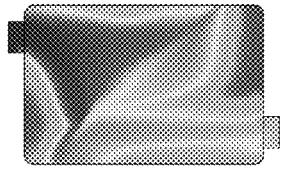
Figure 6C:
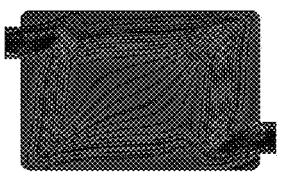
Figure 6D:
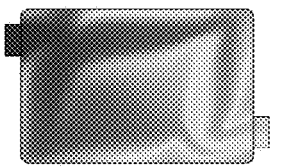
Figure 7C:
Figure 7D:
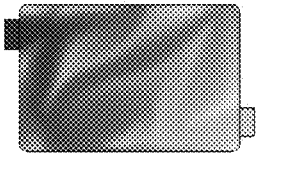

FIGS. 5C, 6C, and 7C illustrate velocity streamlines of a respective optimized fuel cell design, and FIGS. 5D, 6D, and 7D illustrate reactant concentration of a respective optimized fuel cell design.

The illustrated example of FIGS. 5A to 5D present a design that prioritizes flow resistance, the illustrated example of FIGS. 6A to 6D present a design that balances uniform reaction and flow resistance, and the illustrated example of FIGS. 7A to 7D present a design that prioritizes uniform reaction.

In the illustrated example of FIGS. 6A to 6D, the "balanced" design uses example conditions of $w_1=w_2=0.5$. The velocity streamline of FIG. 6C illustrates "box-like" main flow path results. The reactant concentration of FIG. 6D illustrates vertical cross flows and in-plane diffusion facilitate distribution of the reactant to the center region. This example design finds a good balance between the objectives of reaction uniformity and flow resistance.

Figure 8A:
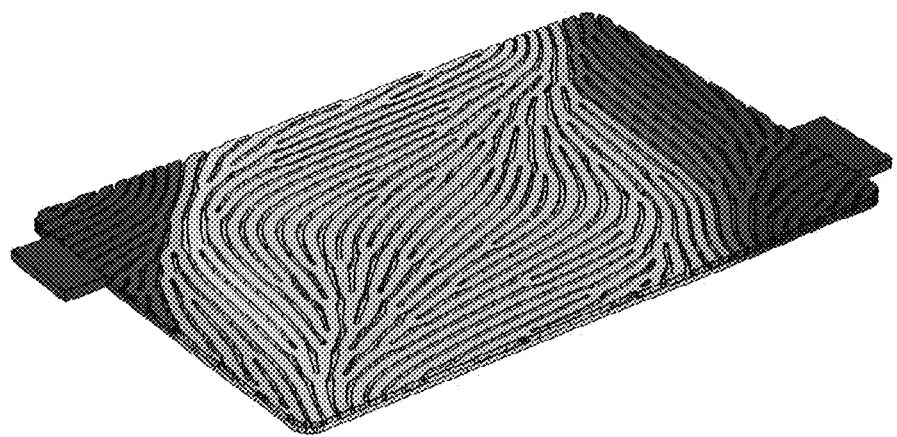
FIGS. 8A and 8B illustrate a three-dimensional pressure profile of an explicit microchannel design (that balances the objectives of uniform reaction and flow resistance) with the gas diffusion layer, and two-dimensional pressure profile of the optimized anisotropic porous media, in accordance with one or more embodiments set forth, described, and/or illustrated herein.
Figure 8B:
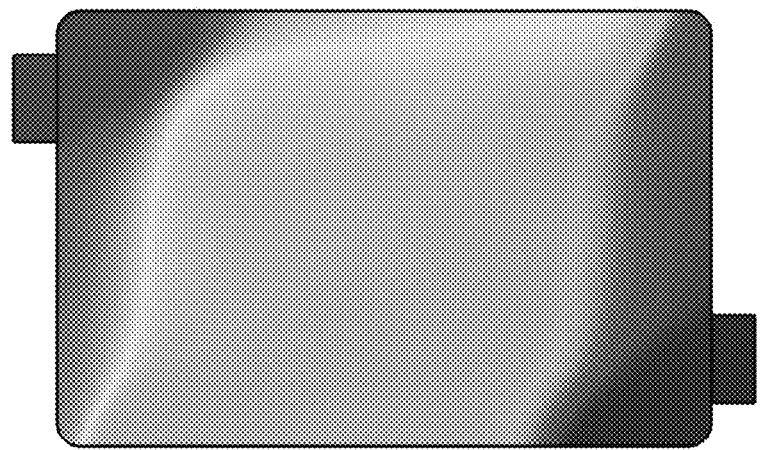

The illustrated examples of FIGS. 8A and 8B illustrate a three-dimensional pressure profile of an explicit microchannel design (that balances uniform reaction and flow resistance) with the gas diffusion layer, and a two-dimensional pressure profile of the optimized anisotropic porous media. The three-dimensional pressure profile matches well with the two-dimensional pressure profile as intended.

An inverse design method was presented to optimize anisotropic porous media with a dehomogenization method to synthesize microchannel fluid flow networks. As more physics are added to the framework, including water generation and thermal management, the one or more methods may be used to design high-performing and reliable fuel cells.

Methods

Figure 9:
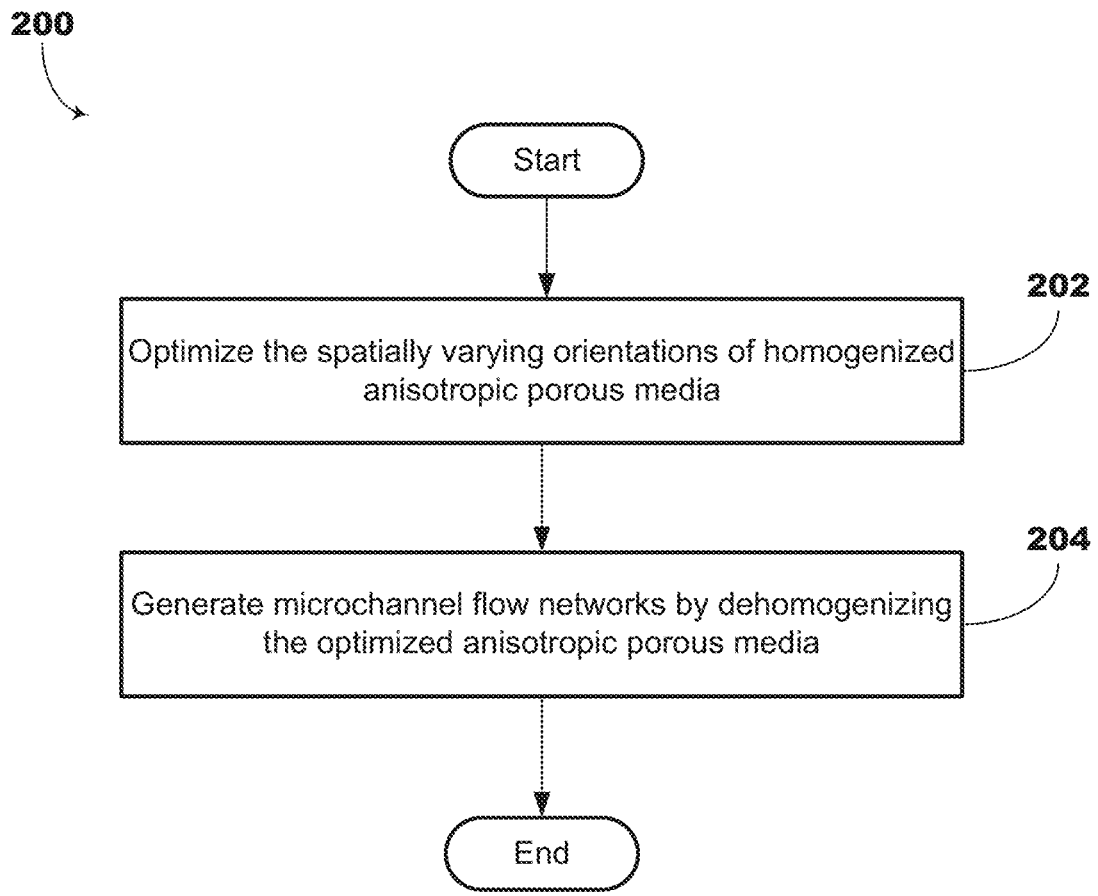
FIGS. 9 and 10 respectively illustrate a schematic diagram of an example method of designing microchannel fluid flow networks in a fuel cell bipolar plate, in accordance with one or more embodiments shown and described herein.
Figure 10:
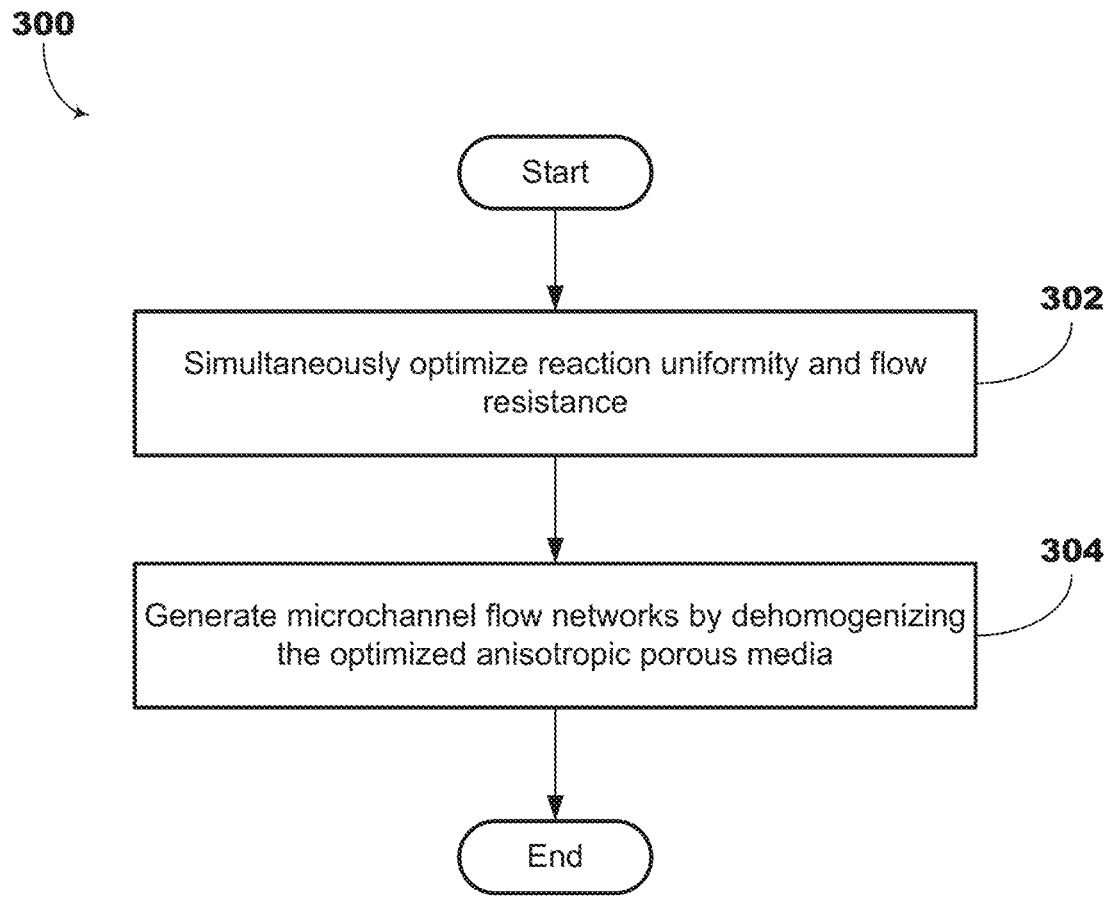

FIGS. 9 and 10 respectively illustrate flowcharts of example methods 200 and 300 of designing microchannel fluid flow networks in a fuel cell bipolar plate, in accordance with one or more embodiments. Each method is to yield an optimized design of a fuel cell bipolar plate having channel configurations that minimize pressure drop across the fuel cell while also obtaining uniform reaction performance across the fuel cell. Moreover, each method is to yield an optimized design of a fuel cell bipolar having enhanced thermal management and operational performance. Such uniform cooling, in turn, facilitates more uniform reactions at the MEA that in turn, maximizes the generation of electricity by the fuel cell stack.

The flowchart of each respective method 200 and 300 corresponds in whole or in part to the schematic illustrations of the method illustrated in FIG. 2 which is set forth and described herein. In accordance with embodiments, each method 200 and 300 may be implemented, for example, using logic instructions (e.g., software), configurable logic, fixed-functionality hardware logic, etc., or any combination thereof. As an example, software executed on one or more computing systems may provide functionality described or illustrated herein. Each computing system respectively includes one or more processors. In particular, software executing on one or more computer systems may perform one or more fabrication or processing blocks of each method 200 and 300 set forth, described, and/or illustrated herein or provides functionality described or illustrated herein.

As illustrated in FIG. 9, in the method 200, illustrated processing block 202 includes optimizing the spatially varying orientations of homogenized anisotropic porous media for the fuel cell by iteratively executing a gradient-based algorithm that incorporates objective functions of reaction variation and flow resistance.

The method 200 can then proceed to illustrated process block 204, which includes generating, in response to the homogenized anisotropic porous media optimization, one or more microchannel fluid flow networks by dehomogenizing the optimized anisotropic porous media. The method 200 can then terminate or end after execution of process block 204.

As illustrated in FIG. 10, in the method 300, illustrated processing block 302 includes simultaneously optimizing reaction uniformity and flow resistance by iteratively executing a gradient-based algorithm to generate homogenized anisotropic porous media for the fuel cell.

The method 300 can then proceed to illustrated process block 304, which includes generating, in response to the homogenized anisotropic porous media optimization, one or more microchannel fluid flow networks by dehomogenizing the optimized anisotropic porous media. The method 300 can then terminate or end after execution of process block 304.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the one or more embodiments can be implemented in a variety of forms. Therefore, while the embodiments are set forth, illustrated, and/or described in connection with particular examples thereof, the true scope of the embodiments should not be so limited since other modifications will become apparent to the skilled practitioner upon a study of the drawings, specification, and claims.

What is claimed is:

1. A method of designing microchannel fluid flow networks in a fuel cell bipolar plate, the method comprising:
by one or more computing devices having one or more processors:
modifying the spatially varying orientations of homogenized anisotropic porous media by iteratively executing a gradient-based algorithm based on a first objective function of reaction uniformity of the homogenized anisotropic porous media and a second objective function of flow resistance of the homogenized anisotropic porous media; and
generating, in response to the homogenized anisotropic porous media optimization, one or more microchannel fluid flow networks by dehomogenizing the modified anisotropic porous media.

2. The method of claim 1, wherein the gradient-based algorithm assigns different weighted factors to the first objective function and the second objective function.

3. The method of claim 1, wherein the gradient-based algorithm assigns a greater weighted factor to reaction uniformity.

4. The method of claim 1, wherein the gradient-based algorithm assigns a greater weighted factor to flow resistance.

5. The method of claim 1, wherein the gradient-based algorithm assigns a weighted factor balanced between reaction variation and flow resistance.

6. The method of claim 1, wherein the homogenized anisotropic porous media modification process uses method of moving asymptotes.

7. The method of claim 1, further comprising, simultaneously with generating one or more microchannel fluid flow networks, synthesizing three-dimensional microchannel fluid flow networks by dehomogenizing the modified anisotropic porous media.

8. A method of designing microchannel fluid flow networks in a fuel cell bipolar plate, the method comprising:
by one or more computing devices having one or more processors:
simultaneously modifying reaction variation of homogenized anisotropic porous media and flow resistance of the homogenized anisotropic porous media by iteratively executing a gradient-based algorithm to generate the homogenized anisotropic porous media for the fuel cell; and
generating, in response to the homogenized anisotropic porous media optimization, one or more microchannel fluid flow networks by dehomogenizing the modified anisotropic porous media.

9. The method of claim 8, wherein the gradient-based algorithm assigns different weighted factors to the first objective function and the second objective function.

10. The method of claim 8, wherein the gradient-based algorithm assigns a greater weight value to reaction uniformity.

11. The method of claim 8, wherein the gradient-based algorithm assigns a greater weight value to flow resistance.

12. The method of claim 8, wherein the gradient-based algorithm assigns a weight value balanced between reaction variation and flow resistance.

13. The method of claim 8, wherein the homogenized anisotropic porous media modification process uses method of moving asymptotes.

14. The method of claim 8, further comprising, simultaneously with generating one or more microchannel fluid flow networks, synthesizing three-dimensional microchannel fluid flow networks by dehomogenizing the modified anisotropic porous media.

15. A computer program product, comprising a set of instructions, which when executed by one or more processors, cause the one or more processors to:
   design microchannel fluid flow networks in a fuel cell bipolar plate by:
   modifying the spatially varying orientations of homogenized anisotropic porous media by iteratively executing a gradient-based algorithm based on a first objective function of reaction uniformity of the homogenized anisotropic porous media and a second objective function of flow resistance of the homogenized anisotropic porous media; and
   generating, in response to the homogenized anisotropic porous media optimization, one or more microchannel fluid flow networks by dehomogenizing the modified anisotropic porous media.

16. The computer program product of claim 15, wherein the gradient-based algorithm assigns different weighted factors to the first objective function and the second objective function.

17. The computer program product of claim 15, wherein the gradient-based algorithm assigns a greater weight value to reaction uniformity.

18. The computer program product of claim 15, wherein the gradient-based algorithm assigns a greater weight value to flow resistance.

19. The computer program product of claim 15, wherein the gradient-based algorithm assigns a weight value balanced between reaction variation and flow resistance.

20. The computer program product of claim 15, further comprising, simultaneously with generating one or more microchannel fluid flow networks, synthesizing three-dimensional microchannel fluid flow networks by dehomogenizing the modified anisotropic porous media.

* * * * *